United States Patent
Trainor

(10) Patent No.: US 9,691,183 B2
(45) Date of Patent: Jun. 27, 2017

(54) SYSTEM AND METHOD FOR DYNAMICALLY GENERATING CONTEXTUAL AND PERSONALIZED DIGITAL CONTENT

(71) Applicant: Sentireal Limited, Belfast (GB)

(72) Inventor: David Trainor, Belfast (GB)

(73) Assignee: Sentireal Limited, Belfast (GB)

( * ) Notice: Subject to any disclaimer, the term of this patent is extended or adjusted under 35 U.S.C. 154(b) by 0 days.

(21) Appl. No.: 14/747,481

(22) Filed: Jun. 23, 2015

(65) Prior Publication Data

US 2015/0379774 A1 Dec. 31, 2015

(30) Foreign Application Priority Data

Jun. 27, 2014 (GB) .................................. 1411519.0

(51) Int. Cl.
| | |
|---|---|
| G09G 5/00 | (2006.01) |
| G06T 19/00 | (2011.01) |
| G06F 17/30 | (2006.01) |
| H04L 29/08 | (2006.01) |

(52) U.S. Cl.
CPC ...... *G06T 19/006* (2013.01); *G06F 17/30047* (2013.01); *H04L 67/2804* (2013.01)

(58) Field of Classification Search
None
See application file for complete search history.

(56) References Cited

U.S. PATENT DOCUMENTS

| | | | |
|---|---|---|---|
| 2009/0102859 A1 | 4/2009 | Athsani et al. | |
| 2012/0232966 A1 | 9/2012 | Calman et al. | |
| 2013/0273968 A1 | 10/2013 | Rhoads et al. | |
| 2013/0286048 A1* | 10/2013 | Sternitzke | ......... G06F 17/30041 345/633 |

FOREIGN PATENT DOCUMENTS

GB 2501567 A 10/2013

OTHER PUBLICATIONS

Search Report for British Patent Application No. 1411519.0, mailed Dec. 11, 2014, 1 page.

* cited by examiner

*Primary Examiner* — Martin Mushambo
(74) *Attorney, Agent, or Firm* — Withrow & Terranova, P.L.L.C.

(57) ABSTRACT

A digital content generating system comprising mobile computing devices in communication with a server. A sensor data analyser receives data, generated by the sensors one of the mobile devices in respect of a real-world scene and determines features of the real-world scene from the data. A data analytics system matches the real-world scene features and user preferences with digital content items to create personalised digital content for the user of the mobile device. The system therefore dynamically generates digital content that is automatically and contextually constructed, the context being created from automatically-sensed features in the user's physical environment and from the user's interests and opinions.

35 Claims, 2 Drawing Sheets

SYSTEM AND METHOD FOR DYNAMICALLY GENERATING CONTEXTUAL AND PERSONALIZED DIGITAL CONTENT

RELATED APPLICATIONS

This application claims priority to UK patent application number 1411519.0, filed Jun. 27, 2014, the disclosure of which is incorporated herein by reference in its entirety.

FIELD OF THE DISCLOSURE

The present invention relates to systems and methods for generating digital content, particularly but not exclusively for use by augmented reality systems.

BACKGROUND

Augmented Reality (AR) systems in which digital content is delivered to a user via a mobile computing device are well known. Known AR systems have, at best, basic means, such as absolute location or identification of a predetermined object, to determine whether a user should be notified that a particular real-world location/scene is suitable for generating digital content that the user will find personally relevant. Accordingly, conventional systems do not fully consider wider contextual and environmental parameters when deciding whether to provide the user with an automated notification of the availability of digital content that the user is highly likely to find relevant, should the user decide to subsequently invoke sensing of the real-world scene with the full set of available sensors on his mobile device.

Also, in conventional AR systems, an individual real-world scene has a limited set of digital content associated with it and that content is in a predetermined presentation style (graphics, video, audio, etc.). Any tailoring of the information presented by the content to user-specific needs, including but not limited to user preferences, is conducted based on a small number of general user preferences, explicitly indicated by the user. The digital content associated with each general user preference is stored in logically-distinct libraries and databases. Contextual and environmental information is not considered in the decision as to which information, and hence content, to provide to a particular user in a particular context or environment. Every user gets similar information and digital content, regardless of their detailed and implicit personal needs, parameters of their physical environment (e.g. ambient lighting level, background noise level, and so on) and their social context (e.g. alone, with friends, in a business meeting, and so on). Accordingly known AR systems do not automatically generate digital content where the information within the content and the content presentation style (e.g. how vision, sound and touch outputs are used) is tailored to detailed personal needs, including personal preferences, and important aspects of personal context/environment.

It would be desirable therefore to dynamically generate highly contextual and personalized digital content, especially but not exclusively for use in AR systems. Education and healthcare are examples of application areas where such highly contextual and personalized information and hence digital content would be particularly useful and relevant.

SUMMARY

A first aspect of the invention provides a digital content generating system comprising:

at least one computing device associated with a respective user, said at least one computing device including or being connected to at least one sensor for detecting at least one aspect of an environment in which said at least one computing device is located;

a respective sensor data analyzer configured to receive data, generated by said at least one sensor of a respective one of said at least one computing device, in respect of a real-world scene in said environment, said respective sensor data analyzer being configured to determine at least one feature of said real-world scene from said received data;

a digital library containing a plurality of digital data content items, in particular digital media content items, each content item having associated respective metadata, which advantageously is indicative of the form and/or context of the content item, for example being indicative of one or more parameters relating to the information subject matter and/or content presentation style associated with the content item;

a respective user record for said respective user, said respective user record containing respective user preferences for the respective user; and a data analytics system configured to match data being indicative of and/or derived from said at least one feature of said real-world scene and data being indicative of and/or derived from the respective user preferences for the respective user with said respective metadata and/or data derived from said metadata, and to create digital content for said respective user comprising at least one of said digital data content items that are deemed to match said real-world scene and the respective user preferences.

Said user preferences, which may be referred to as needs, may include explicitly-expressed and implicitly-detected preferences/needs of the user, for example needs/preferences expressed by the user by explicit indication to the system and needs/preferences that are implicit (not directly selected by the user) but are detected by the system by indirect means. Therefore, the user preferences may include preferences that are explicitly provided to the system by the user (by any input means) and preferences that are detected (e.g. determined) by the system by indirect means, typically during use of the system by the user, e.g. from the user's interaction with the system, in particular with the user's computing device by means of a sensor or other input means. The user interaction may be in response to the delivery (rendering) of digital content to the user by the system, i.e. user feedback. Moreover, the term "user preference" as used herein is intended to embrace "user needs".

Said respective user record preferably comprises a respective set of respective user data for said respective user, said respective user data being indicative of at least one of, but preferably both of, explicitly-expressed and implicitly-detected needs/preferences, of the respective user. For example the data may be indicative of one or more parameters associated with the user's explicitly-expressed and implicitly-detected needs or preferences.

A second aspect of the invention provides an augmented reality system comprising the digital content generating system of the first aspect of the invention.

A third aspect of the invention provides a method of generating digital content for at least one computing device associated with a respective user, said at least one computing device including or being connected to at least one sensor for detecting at least one aspect of an environment in which said at least one computing device is located, said method comprising:

receiving data, generated by said at least one sensor of a respective one of said at least one computing device, in respect of a real-world scene in said environment;

determining at least one feature of said real-world scene from said received data;

maintaining a digital library containing a plurality of digital data content items, in particular digital media content items, each content item having associated respective metadata, which advantageously is indicative of the form and/or context of the content item, for example being indicative of one or more parameters relating to the information subject matter and/or content presentation style associated with the content item;

maintaining a respective user record for said respective user, said respective user record containing respective user preferences for the respective user;

matching data that is indicative of and/or derived from said at least one feature of said real-world scene and data being indicative of and/or derived from the respective user preferences for the respective user with said respective metadata and/or data derived from said metadata; and creating digital content for said respective user comprising at least one of said digital data content items that are deemed to match said real-world scene and the respective user preferences.

Said user preferences, which may be referred to as needs, may include explicitly-expressed and implicitly-detected preferences/needs of the user, for example needs/preferences expressed by the user by explicit indication to the system and needs/preferences that are implicit (not directly selected by the user) but are detected by the system by indirect means.

Said respective user record preferably comprises a respective set of respective user data for said respective user, said respective user data being indicative of at least one of, but preferably both of, explicitly-expressed and implicitly-detected needs/preferences, of the respective user. For example the data may be indicative of one or more parameters associated with the user's explicitly-expressed and implicitly-detected needs or preferences.

Preferred features are recited in the dependent claims appended hereto.

Preferred embodiments of the invention dynamically generate digital content that is automatically and contextually constructed. The context is preferably created from automatically-sensed features in the user's physical environment and from the user's interests and opinions.

Further advantageous aspects of the invention will be apparent to those ordinarily skilled in the art upon review of the following description of a specific embodiment and with reference to the accompanying drawings.

Those skilled in the art will appreciate the scope of the disclosure and realize additional aspects thereof after reading the following detailed description in association with the accompanying drawings.

BRIEF DESCRIPTION OF THE DRAWINGS

An embodiment of the invention is now described by way of example and with reference to the accompanying drawings in which.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Figure 1:
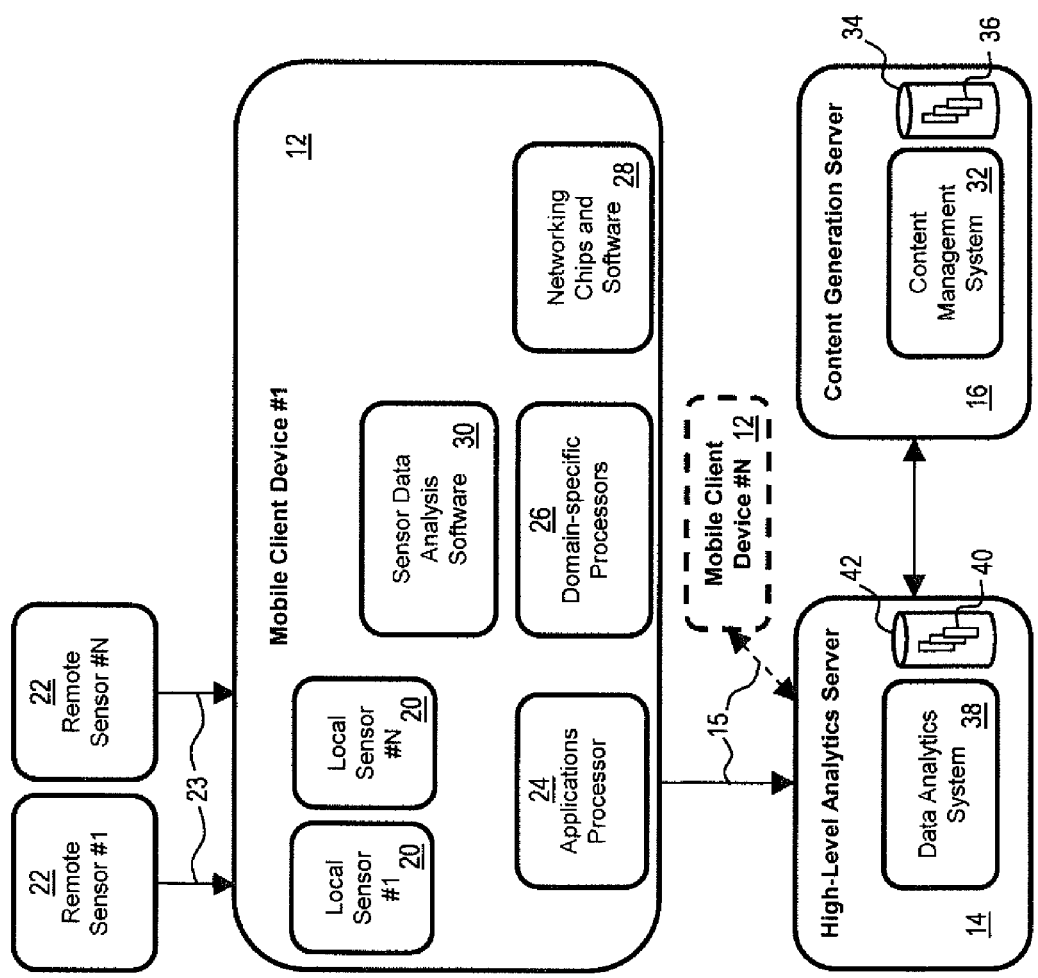
FIG. 1 is a block diagram of a digital content generating system embodying one aspect of the invention.

Referring now to FIG. 1 of the drawings there is shown, generally indicated as 10, a digital content generating system embodying one aspect of the present invention. The system 10 includes a plurality of mobile client devices 12, each assumed to be used by a respective user (not shown). In FIG. 1 two mobile client devices 12 are shown for the purpose of illustration although typical systems would include more than two. In typical embodiments, each client device 12 is a mobile computing device, usually one that can be easily carried or worn, and which contains sensors, processing capabilities, and wireless networking capabilities to enable it to participate in the system 10 as described hereinafter. Typical examples of such devices are smartphones, tablet computers, portable games consoles, smart glasses or other consumer electronics devices.

The system 10 also includes a first server, referred to herein as the high level analytics server 14, which comprises conventional computer software and hardware (not illustrated) to enable it to act as a server, including communicating with the client devices 12. The client devices 12 are in communication with the analytics server 14 via a respective communications link 15. The communications links 15 may be made across one or more communications networks (not shown), e.g. comprising any one or more of a Wide Area Network (WAN), Local Area Network (LAN) or Internet. Typically, the client devices 12 are equipped for wireless communication and connect wirelessly to the communication network(s).

The system 10 further includes a second server, referred to herein as the content generation server 16, which comprises conventional computer software and hardware (not illustrated) to enable it to act as a server and to communicate with the high level analytics server 14. The high level analytics server 14 and the content generation server 16 are in communication with one another via a communications link 18 across one or more communications networks (not shown), e.g. comprising any one or more of a Wide Area Network (WAN), Local Area Network (LAN) or Internet. The high level analytics server 14 may be equipped in any convenient conventional manner for such communication.

It will be understood that in alternative embodiments, the high level analytics server 14 and the content generation server 16 need not be separate. Instead, a single server (not illustrated) may be provided for performing all of the tasks of the high level analytics server 14 and the content generation server 16, and to this end may include all the relevant hardware, software, communication and networking capabilities, including the data analytics system and content management system described hereinafter.

Each client device 12 includes or is connected to one or more sensors for detecting one or more aspect of its environment, preferably including the detection of any user input, e.g. commands, by implementing a user interface (e.g. touchscreen, speech recognition, gesture recognition, etc.). Such user input and commands may occur as a direct result of the user consuming and/or interacting with the digital content that has just been generated and rendered by the system, thereby forming user feedback into the sensors. Hence, user input, including user feedback, can provide an implicit means of identifying the user's preferences/needs.

For example, rapid dismissal of currently-rendering content by a user-generated screen tap, swipe or gesture could be interpreted by the system as the current content failing to satisfy user preferences and/or contextual suitability and the system may adjust upcoming generated content based on this feedback. Similarly, complex and explorative user interactions with currently-rendering content, such as zooming, panning or revealing currently-hidden details from summary information (for example, by triggering a pop-up window) could be interpreted by the system as the current content being especially suitable for the user in their current context and the system may prioritise the short-term generation of similar content based on this user feedback. More generally, the system 10 may modify any one or more of: digital content that is being delivered; digital content that is being or has been compiled or that is intended for delivery, to the user; and/or the user record, in response to user input detected by the mobile client device 12. The user input may take the form of user feedback in response to, e.g. during, the delivery of digital content to the user by the system 10, but may alternatively, or in addition, comprise any user input detected by the device 12, e.g. during the user's use with another software application supported by the device 12, The user input may be detected by any one or more of the sensors of the mobile device 12.

Preferably, any one or more of the following environment sensing capabilities are supported: image sensing (e.g. by a camera); audio sensing (e.g. by a microphone); haptic input sensing (e.g. by a touchscreen, button or accelerometer); device orientation and movement sensing (e.g. by an accelerometer or gyroscopic device); device and user geolocation sensing (e.g. by a GPS device); and temperature and/or humidity sensing (e.g. by a temperature and/or humidity sensor).

To this end each client device 12 includes one or more integrated conventional local sensors 20 and/or is connectable, typically wirelessly, to one or more physically-separate remote sensors 22, e.g. wearable microphones or smart glasses, all of which are capable of communicating environmental information to the client device 12. In preferred embodiments, a respective wireless link 23, for example using known short-range wireless technology such as Bluetooth Smart, 6LowPAN, Bluetooth Classic and WiFi, is used to connect the remote sensors 22 to a respective client device 12, although the connection may be wired.

In conventional manner, each client device 12 includes at least one processor supporting computer software to enable the client device 12 to function, the details of which may vary depending on what type of device the client 12 is. Typically, the data-processing capabilities of the client device 12 are embodied by an internal applications processor 24 and optionally one or more domain-specific processors 26 for accelerating or offloading processing of specific types of data for specific applications. In preferred embodiments, the applications processor 24 contains any one or more of the following conventional processing components: a single-core or multi-core central processing unit (CPU); a Graphics Processing Unit (GPU); and a single-core or multi-core Digital Signal Processor (DSP). Similarly, in preferred embodiments the domain-specific processor(s) 26 are provided for processing any one or more of following types of data: image data (2D or 3D); generic audio data (single-channel or multi-channel); and/or speech data (single-channel or multi-channel). It will be understood that the client 12 may be provided any one or more of these processing components in any alternative conventional manner.

In this example, the communications capabilities of the client device 12 are provided by an integrated networking chips and software module 28, which capabilities include connecting the client device 12 to the remote sensors 22, and also connecting the client device 12 to the high-level analytics server 14. The networking chips and software module 28 provides the client device 12 with the capabilities to set up and maintain the required network connections and may take any conventional form.

In the preferred embodiment, each client device 12 includes a sensor data analyzer 30, typically implemented as sensor data analysis software. The software may be stored in memory (not shown) in the client device 12 and is executed by the device processor(s) in conventional manner, In this example, the sensor data analysis software is executed by any suitable combination of the applications processor 24 and domain-specific processors 26. Within the applications processor 24, any suitable combination of internal CPUs, GPUs or DSPs may be used to execute the sensor data analysis software 30. It will be understood that in alternative embodiments, the sensor data analyzer 30 may wholly or partly be provided elsewhere in the system 10, for example at the high-level analytics server 14.

In use, the sensor data analyzer 30 analyses each successive set of data captured by the device sensors 20, 22. This may be regarded as "low-level" analysis, as opposed to "high-level" analysis conducted on the high-level analytics server 14, and is configured to calculate or infer relatively small, detailed and/or fundamental features from each successive set of sensor data and preferably not any high-level contextual or semantic information. It is noted that the sensor data analyzer 30 can operate either on a full or partial set of sensor data, i.e. when either all of, or any one or more of the sensors 20, 22 are active. In typical embodiments, the number, type and accuracy of the features calculated by the sensor data analyzer 30 changes as any one or more of the sensors 20, 22 becomes active or inactive. However it is preferred that the sensor data analyzer 30 makes fullest use of whatever amount of sensor data is presented to it on each occasion.

In preferred embodiments, the sensor data analyzer 30 is configured to calculate any one or more of the following low level, or primitive, features from the respective class of sensor data, using any conventional method(s):

From image sensor data: overall light intensity level; distribution of light intensity across the scene space; pixel colour statistics; features to detect object boundaries; features to detect moving objects; features to measure object depth in a scene from either monoscopic or stereoscopic data; features to facilitate object classification or recognition; features to facilitate human facial classification or recognition; features to facilitate human gesture classification or recognition; and/or features to facilitate human emotion classification or recognition from facial expressions.

From audio sensor data: overall sound intensity level; distribution/directionality of sound intensity across the scene space from mono, stereo or multichannel audio sensors; frequency content of sound; features to facilitate separation (un-mixing) of distinct sound sources (includes noise reduction); features to facilitate sound source classification or recognition; features to detect object materials or textures; features to facilitate human speech classification or recognition; and/or features to facilitate human emotion classification or recognition from speech utterances.

From haptic sensor data: touch pressure; touch frequency; touch movement direction; touch movement speed; timing between system events such as the presentation of digital content and subsequent input, e.g. touch, events from the user; and/or features to facilitate calculation of the spatial positioning of multiple active touch points.

From device movement and orientation sensor data: features to facilitate calculation of current device orientation in space; features to facilitate calculation of movement or rotation direction; and/or features to facilitate calculation of movement or rotation speed.

From location sensor data: client device 12 location coordinates; user location coordinates (e.g. when the user is wearing one or more remote sensors 22); and/or features to facilitate calculation of separation between the client device and its user (e.g. when the user is wearing one or more remote sensors 22).

From temperature and/or humidity sensor data: current temperature and/or humidity; average temperature and/or humidity; and/or temperature and/or humidity gradient or change.

Any of the above features may be obtained from the respective data in any convenient conventional manner, and this may be generally referred to as feature calculation from the relevant sensor data. It will be understood that the features identified above are not an exhaustive list of features that may be obtained from the sensor data.

The primitive features identified above are typically individually computed from the respective type of sensor data (image, audio, haptic, etc.). Alternatively, or in addition, the sensor data analyzer 30 may calculate features, e.g. including more sophisticated versions of at least some of the features identified above, by employing sensor fusion. Sensor fusion is the combining of sensory data from disparate sensor types such that the resulting information is in some sense better than would be possible when the relevant sensor data is individually. In preferred embodiments, this involves combining or fusing data coming from any one or more of the different types of sensor 20, 22 (image, audio, haptic, etc.) available to the device 12. Typically, sensor fusion increases the accuracy and reduces the variance/error of a feature value calculation compared to calculating the same value using the data from any individual sensor type. The client device 12, or more particularly the sensor data analyzer 20, may be configured to implement one or more conventional sensor fusion algorithms including but not limited to Kalman filtering and/or application of central limit theorem.

In preferred embodiments, the following features may be calculated by fusing data from any suitable two or more of the sensors 20, 22, using any conventional method: features to detect object boundaries—which may involve fusing any two or more of image, audio (e.g. measuring reverb/reflections from object) and haptic (e.g. when the user touches object ends on screen) sensor data; features to detect moving objects—which may involve fusing any two or more of image, audio (e.g. "Doppler effect") and haptic (e.g. when the user traces object path on screen) sensor data; features to measure object depth in a scene—which may involve fusing any two or more of image plus audio (e.g. measuring reverb/reflections from object) and haptic (e.g. when the user touches the ends of an object of known size on screen) sensor data; features to facilitate object classification or recognition—which may involve fusing image and audio (e.g. recognizing any speech that may describe the object) sensor data; features to facilitate human speech classification or recognition—which may involve fusing image (e.g. of lip/mouth shapes) and audio sensor data; and/or features to facilitate human emotion classification or recognition—which may involve fusing any two or more of image (e.g. of facial expression), audio (e.g. of prosody or "tone of voice" or recognizing any speech that may describe emotional state) and haptic (e.g. touch pressure or frequency) sensor data.

The sensor data analyzer 30 may also be configured to perform dimensionality reduction on any one or more of the features calculated from the (individual or combined) sensor data. The results from the feature calculation and/or sensor fusion steps can be considered as long lists, or vectors, of numbers. These vectors each contain multiple numbers and hence may be said to have a high dimensionality. To reduce the communications overhead and the potential of over-constraining or over-fitting statistical models resident on the high-level analytics server 14, intermediate results produced by the sensor data analyzer 30 may undergo dimensionality reduction. This is a process whereby the multidimensional vectors are mathematically transformed or projected so that the number of dimensions is reduced and vectors that have large separation in the higher-dimension space also have large separation in the lower-dimensional space. In preferred embodiments either one or both of the following types of conventional dimensionality reduction techniques may be employed: principal component analysis; and/or linear discriminant analysis.

The steps of feature calculation, fusion and dimensionality reduction may be carried out iteratively and/or in different orders so that the sensor data analyzer 30 converges to a final representative set of feature values for the each successive set of input sensor data.

The system 10 includes a digital library 34 containing a plurality of primitive data content items 36, each item comprising digital data, e.g. a digital data file, which may be referred to as media data. The digital library 34 is conveniently provided on the content generation server 16, although it could be provided elsewhere in the system 10. In preferred embodiments, each primitive data content item may comprise any one or more of the following: textual information; computer graphics animation sequence(s) (e.g. models, graphical textures, movement sequences, and so on); image(s); video sequence(s); audio sequence(s); haptic feedback directive(s) and/or control signaling; and networking information, such as Internet URLs, where other content items exist.

In addition to the media data, each data content item 36 available at the content generation server 16 has associated metadata (of the type sometimes referred to as descriptive metadata) that carries information, preferably contextual and/or semantic information, about the respective data content item 36. In preferred embodiments the metadata for each data content item 36 specifies any one or more of the following conventional labels: content sensory and/or presentation type (e.g. any one or more of visual, aural, haptic, mixed, and so on); content presentation format (e.g. any one or more of sampling rates, channels, 2D/3D, source positioning, and so on); content presentation statistics (e.g. any one or more of average brightness level, average volume level, color composition, and so on); content topic relevance and/or similarity (e.g. any one or more of art, cinema, history, geography, literature, technology, healthcare, medicine etc.); content genre (e.g. any one or more of sci fi, comedy, rock, jazz, etc.)

The metadata for the data content items 36 can be stored in any convenient computer storage facility, for example using conventional database technology. Typically, the metadata is stored as separate data to the respective media data item 36, but both the data item 36 and metadata are conveniently stored as separate fields in any suitable common media "container format" so that a single computer file contains both data 36 and metadata. In the present example, the metadata may be stored in the library. Relationships, in particular semantic relationships, between respective elements of the respective metadata, in particular elements of content context information contained in the metadata, are stored using any convenient conventional technique(s) for maintaining information science ontologies. These relationships may be said to comprise data derived from the respective metadata. The relationship data may be stored in the digital library, as is convenient. In preferred embodiments, the metadata and as applicable the relationships/ontologies associated with its elements are communicated from the content generation server 16 to the high-level analytics server 14 (which may store the data in any convenient computer storage facility (not shown)).

In preferred embodiments, the content generation server 16 hosts a content management system 32, which is responsible for the addition, deletion, maintenance and/or generation of metadata, and preferably also the relationships between elements of the metadata, for the primitive multimedia data content items 36. Any one or more of the primitive multimedia data content items 36 may be combined in any suitable way to create a complete set of digital content that is personalized for a particular user of the system 10 in their current environment and context. The digital library 34 is accessible to the content management system 32.

In typical embodiments, the data content items 36, i.e. the actual media data samples, are uploaded to the content server 16 from another computer (not shown) used by the relevant content author (not shown). For example, a piece of audio or video is created/edited on a local desktop computer by a content creator and subsequently uploaded/transferred into the content server database 34. The metadata associated with the content data 36 typically comes from either one of two sources. It may be hand-annotated by the human content creator, i.e. the content creator "labels" the media, and/or the content management system 32 may be configured to automatically infer and assign metadata by analyzing the content data 16 as it is transferred to the content generation server 16. This automated analysis and content metadata generation process may reuse the same set of media data analysis techniques performed by the sensor data analyzer 30 and the data analytics system 38 in analyzing the sensor data captured by the sensors 20, 22.

The high-level analytics server 14 hosts a data analytics system 38 that may comprise any convenient combination of conventional computing hardware, hardware accelerators, data analytics software and data storage (e.g. database) means. In preferred embodiments, the data analytics system 38 is implemented from any one or more of the following conventional hardware and software components: a multi-core central processing unit (CPU); a graphics processing unit (GPU) used for general-purpose computing (GPGPU); parallel-processing predictive analytics algorithms implemented in software; predictive analytics algorithms accelerators implemented in hardware; and a low-latency, in-memory database.

The data analytics system 38 analyses each successive set of low-level feature data calculated by the sensor data analyzer 30 and sent from the client device 12 to the high-level analytics server 14. This analysis may be regarded as "high-level" and involves calculating information about the scene, advantageously relatively high-level contextual and/or semantic information, from the low-level real-world scene features captured in each successive set of low-level feature data sent from the client device 12, i.e. the real world scene as captured by the sensors 20, 22. In preferred embodiments, the data analytics system 38 derives any one or more of the following high-level contextual and/or semantic information from the low-level feature data, using any convenient conventional methods: contextual and/or semantic interpretation of classified and/or identified visual objects, optionally including their spatial distribution and/or their movements; contextual and/or semantic interpretation of classified and/or identified sound sources, optionally including their spatial distribution and/or their movements; contextual and/or semantic interpretation of client device 12 movement and/or orientation; contextual and/or semantic interpretation of client device 12 and/or user geolocation; contextual and/or semantic interpretation of recognized human speech, optionally including its direction and/or movements; contextual and/or semantic interpretation of classified and/or identified people, optionally including their spatial distribution and/or their movements; contextual and/or semantic interpretation of indictors of emotional state from the user of a particular client device 12 or from other person(s) in the real-world scene (who may or may not be other concurrent users of the system 10); and contextual and/or semantic interpretation of user input(s) detected by the system 10, including user feedback, particularly in response to digital content generated and rendered by the system 10.

The contextual and/or semantic information calculated by the data analytics system 38 for the current real-world scene captured by the sensors 20, 22 can be stored in any convenient computer storage facility, for example using conventional database technology, typically on the high-level analytics server 14. Relationships, in particular semantic relationships, between respective elements of the scene information, in particular the scene context information, can be determined, conveniently by the data analytics system 38, using any convenient conventional technique(s) for information science ontologies. These relationships may be said to comprise data derived from the respective scene information. The relationship data may be stored in any convenient computer storage facility.

The data analytics system 38 stores and maintains information that it gathers about each system user in a respective user data record 40. In preferred embodiments information on any one or more of the following user information elements are stored: needs (e.g. educational/training, healthcare/medical); interests (e.g. art, science, literature, film, sports, and so on); and/or likes, dislikes and/or opinions in relation to any one or more topics, all of which may considered as examples of user preferences, or personalized data, stored in the user data record 40. It is noted that some user-specific data (i.e. the user preferences, or personalized data) may be directly or indirectly created or amended by a third-party e.g. a teacher may update the user-specific data of their students based on academic examination results or a doctor may update the user-specific data of their patients based on medical examination results.

The user data records 40 may be stored in any convenient computer storage facility 42, e.g. using conventional database technology. Preferably, semantic and/or other relationships between the respective user information elements in each user data record 40 are determined, conveniently by the data analytics system 38 using conventional technique(s) for information science ontologies, and included in the user data record 40 (or stored in a separate associated record as is convenient). These relationships may be said to comprise data derived from the respective user record 40. The relationship data may be stored in the storage facility 42. Typically, the user record store 42 is provided on the high-level analytics server 14, but may alternatively be provided elsewhere in the system 10 as is convenient.

From the foregoing, it will be apparent that in the preferred embodiment the data analytics system 38 has access to three different sets of information, in particular contextual and/or semantic information:

Contextual and/or semantic information for the current real-world scene and/or environment, derived by high-level contextual and/or semantic analysis on the low-level scene features sent from the client device 12.

Contextual and/or semantic information about the particular system user who is assumed to be using the particular client device 12.

Contextual and/or semantic information about the digital content items 36 residing on the content generation server 16 (i.e. direct contextual/semantic information about the content metadata and hence indirect information about the actual content data items 36, since the metadata describes its corresponding data item 36.

An example of the contextual information and subsequent matching is that the real-world scene at the user's geolocation contains a well-lit and unobstructed view of a ruined castle (hence an overlay of visual information on the view of the castle would be appropriate), the user data record indicates that this user has an interest, e.g. an educational need, in the topic of art and the content information indicates that a digital image of a painting of this particular castle in its pre-ruined state exists in the content library. Under these circumstances this particular digital image will, with high probability, be one of the content items selected for this scene and this user. As a more general example of this type we could have a) real-world scene contains an object of class X, typically in physical environment Y, b) user has an educational need (or other interest) in subject Z, c) content library contains media data, e.g. video, images and/or audio commentary related to subject Z that reference objects of class X and can be clearly and intelligibly presented in physical environment Y.

In preferred embodiments, each of these sets of information comprises data indicative of a respective collection of contextual and/or semantic terms and/or or values and/or defined relationships between different elements in the respective collection. Using this data, the data analytics system 38 makes a three-way match between the real-world scene information (e.g. environmental, contextual and/or user input/feedback information), the user information (as captured in the user data record 40) and the content metadata, to identify a set of digital content items 36 whose metadata suitably aligns with both the current real-world scene and the user preferences, e.g. interests and/or opinions. The matching analysis can be conducted by any conventional means for measuring similarity between elements of different sets, e.g. any convenient conventional data matching analysis algorithm(s). In preferred embodiments, the data analytics system 38 utilizes any one or more of the following conventional techniques to identify the most-suitable digital content items: incorporate each of the three sets of information into a graph (or equivalent mathematical tool), with each element of each set of information represented as a node in the graph; define respective relationships between the respective elements of the three previously-disparate sets of information (relationships between elements within each of the three previously-disparate sets have already been defined); assign graph edges a relevance or similarity score based on the relationship between the corresponding graph nodes; traverse the graph to find paths that maximize relevance/similarity between nodes corresponding to real-world scene context, user information context and digital content metadata; and/or train and subsequently utilize a neural network to classify digital content items into levels of applicability based on the real-world scene information, user information and content metadata inputs.

After the matching analysis is completed for the current real-world scene, the data analytics system 38 selects one or more digital content items 36 that it deems most appropriate for the user using the similarity scores calculated in respect of the available digital content items 36. The selected content items 36 may be regarded as digital content created for the user in respect of the detected scene.

Any conventional set of one or more criteria can be applied to decide whether a particular content item 36 is sufficiently relevant to be included in the selected content items 36 for the current scene or not. In a preferred embodiment of the invention any combination of the following criteria may be used: use at least N content items 36 and at most M content items 36 with the highest similarity score (the values of N and M are configurable, and N<=M); ensure that at least P content items 36 and at most Q content items 36 with the highest similarity score are selected for each major class of sensory output (e.g. graphics, image, audio, haptic feedback, etc.), wherein values of P and Q are configurable for each major class of sensory output and P<=Q; and/or combine and incorporate the additional rules and constraints for content item selection and composition into the same neural network used for content item relevancy classification.

Once the respective subset of digital content items 36 has been determined by the data analytics system 38 for the particular user in the particular environment and context (i.e. for the current real world scene) then the high-level analytics server 14 communicates respective content item identifiers (not shown) for all of the items 36 in the subset to the content generation server 16 using any conventional networking technology for use by the content management system 32.

Due to the client-server architecture of the preferred system 10, multiple system users, and therefore multiple client devices 12, can be simultaneously connected to a single instance of the high-level analytics server 14. When multiple active system users are situated in close physical proximity the data analytics system 38 has the capability of either identifying suitable digital content independently for each user or identifying a single set of digital content that is suitable for all users in the collocated group. In the latter case the content item identification process described above may be performed against the (combined) user data records 40 for all users deemed to be part of the collocated group, and the relevance/similarity scores may be calculated using these combined sets of user information.

In preferred embodiments, any one or more of the following conventional methods may be used (typically by the data analytics system 38) to decide if two or more users should be grouped together for digital content generation purposes: by explicit user action, for example multiple users indicating that they want to join a common group via appropriate configuration or settings selection within a mobile software application (e.g. a client application supported by their respective client devices 12 and being part of the system 10); by commonality of user preferences/needs as determined by the (combined) user data records 40 (e.g. the group of users study the same subject or have the same medical condition); and/or by scene similarity, whereby active users whose real-world scenes are determined to be sufficiently similar are grouped together for the purposes of digital content generation. Scene similarity may for example be measured by any one or more of the sensed visual, aural, geolocation or environmental (temperature/humidity) properties of the scene.

Typical operation of the preferred system 10 is now described. It is preferred that the following installation/set-up activities are performed before a system user triggers the primary digital content generation method for the first time: installation of at least some of the data content items 36 on the content generation server 16, generation of associated content metadata and relationships between the metadata elements as described above; installation of a set of initial parameters, e.g. assumptions, rules, ontologies, and any historical data, for the system user data records 40 on the high-level analytics server 14 for use by the analytics system 38. This allows the data analytics system 38 to make reasonable matches between specific real-world scenes/users and digital content 36 before the matching analysis is subsequently refined by individual system users updating their interests (explicitly and/or implicitly), opinions and other preferences/needs, e.g. by use of the system 10.

In preferred embodiments the initial rules, assumptions or preferences (or other initial parameters) are derived from any one or more of the following: statistical content preferences by gender; statistical content preferences associated with the geographical region of system deployment; statistical content preferences associated with specific real-world sites e.g. historical sites, sites of natural beauty, etc.; database of registered user reactions to particular digital content classes or specific digital content items; and relevant user-specific data supplied by qualified third parties (e.g. teachers, doctors, etc.) based on professional assessment or examination. The information in this database may be gathered by any conventional means.

The system 10 preferably supports at least one system data update process (not shown but may for example be implemented by the data analytics system 38 or the content management system 32 as is convenient) for updating the internal state (e.g. including the data items 36, user data records 40 and/or any associated data) of the system 10 at any time whilst it is in operation, advantageously irrespective of the timing or state of invocations of the primary content generation method described hereinafter. For example, a system data update process may update the system 10 such that the revised system data affects the outcome of a subsequent invocation of the primary content generation method, but there is no assumed timing relationship between the invocation of the system data update process(es) and the invocation of the primary content generation method. The preferred embodiment supports the following system data update processes: Available Digital Content Update process, by which digital content items 36 (and their associated metadata) can be added, edited and/or removed from the content generation server 16 at any time. These updates affect the ontologies and defined relationships between elements of content metadata information as discussed above; and User Preference/Need Update, by which the content management system 32 is informed of updates to their individual preferences/needs, e.g. including interests and/or opinions at any time, e.g. by explicit user action or the automated analysis of the analytics system 38. In preferred embodiments, an individual user can cause or allow this system data update by some or all of the following conventional methods: allowing the content management system 32 access to their user profiles on social media sites (e.g. Facebook, Twitter, and so on); allowing the content management system 32 access to their user data for other software applications held locally on their mobile device 12; and/or allowing the content management system 32 access to their educational, medical or other personal data held on other systems. These updates affect the ontologies and defined relationships between elements of User information as described above.

Figure 2:
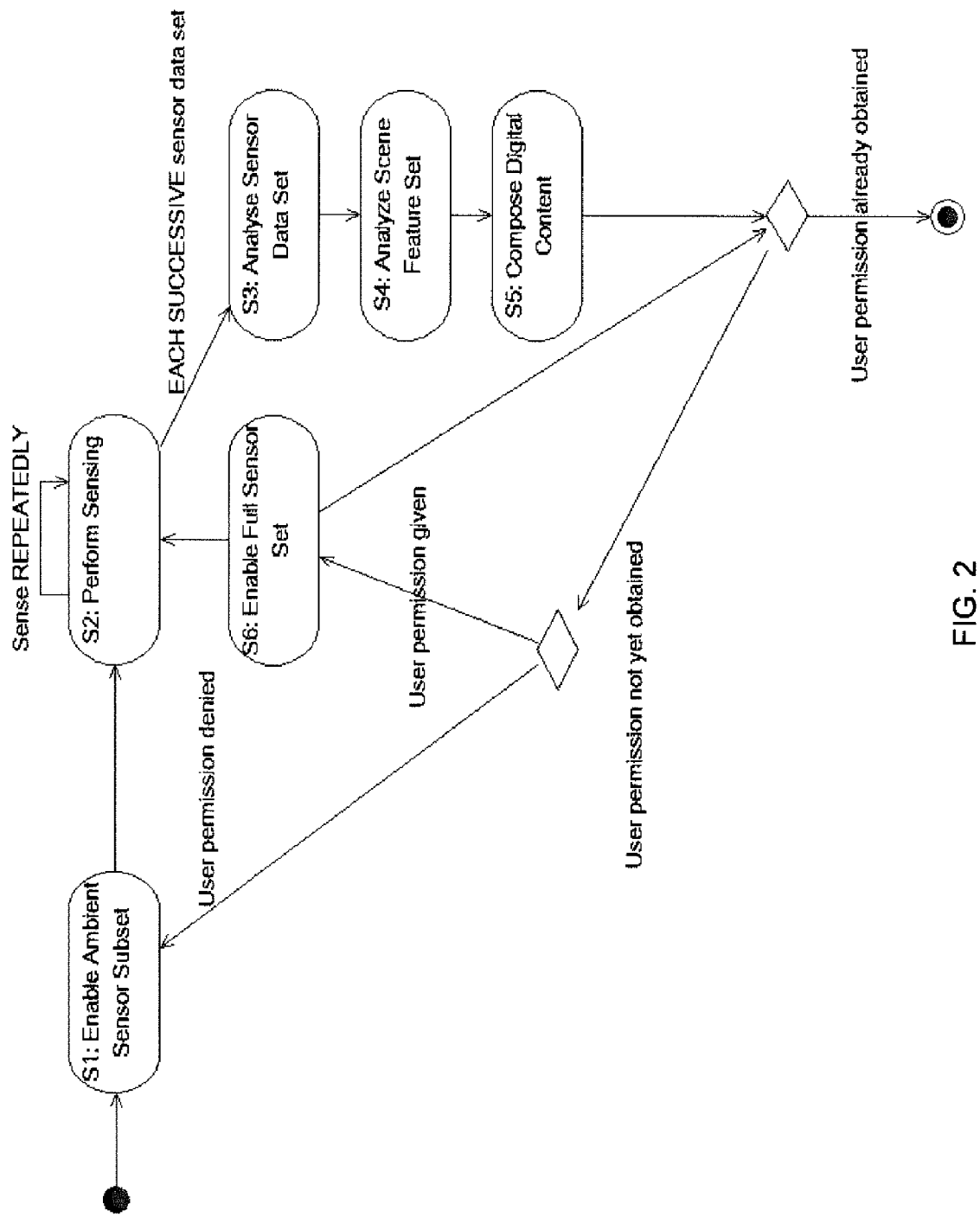
FIG. 2 is a flow chart illustrating a preferred digital content generation method performed by the system of FIG. 1.

FIG. 2 illustrates the preferred primary content generation method supported by the system 10. By this method, an individual system user may cause personalized digital content to be composed by the system 10 based on a specific real-world scene/environment.

The illustrated content generation method comprises six steps, S1 to S6. The method can be decomposed into two major sub-processes, or modes: a User Notification Process (embodied by steps S1, S2, S3, S4, S5); and a User Interaction Process (embodied by steps S6, S2, S3, S4, S5).

The user notification process, which is conveniently performed by the sensor data analyzer 30, is a quiescent part of the preferred primary content generation method, in which the client device 12 uses at least one but preferably not all of its sensors 20, 22 to periodically perform an automated sensing of the current real-world scene around the device 12. The purpose of this to gather enough information about the current real world scene to determine if it is likely to match at least some of the available digital content 36. If so, the device 12 may notify the user that he may wish to effect a more comprehensive sensing of the real-world scene with more, e.g. the full set of, sensors 20, 22. It is preferred only to use a subset of sensors 20, 22 initially for power-saving reasons, although the availability of one or more of the sensors 20, 22 may be taken into account when determining which sensor(s) 20, 22 to use, for example a sensor may be occluded when the client device 12 is in the user's pocket, or may be deactivated.

In step S1, an "always-on" subset of one or more the sensors 20, 22, hereafter referred to as the ambient sensor subset, is activated.

In step S2, the ambient sensor subset captures the current real-world scene. It is noted that any explicit user input being entered via a user interface (any of which may be regarded as a sensor) of the device 12 at the point of sensing, either in response to previous content generated (and rendered) by the system or in general interaction with another software application running on the device 12, may also form part of the captured sensor data. Hence, utilizing user input/feedback can create an implicit means of identifying user needs/preferences. It is preferred that the sensors 20, 22 repeatedly capture the scene at a defined frequency and subsequent steps are carried out in a pipelined fashion for each successive set of sensor data.

In step S3, each set of sensor data captured by the ambient sensor subset is analyzed by the sensor data analyzer 30 in the respective client device 12 and a set of scene features produced, as described above.

In steps S4 and S5, each set of scene feature data, derived from data originally captured by the ambient sensor subset, is communicated to the high-level analytics server 14 and analyzed by the data analytics system 38 in order to define a set of one or more digital content items 36 for the current scene and user, as described above.

In the preferred embodiment, after step S5, the system user is still unaware that the system 10 has found suitable digital content 36 for their current scene, since only the ambient sensor subset is active. However at this point the client device 12, under control of the sensor data analyzer 30, notifies the user that the current scene has digital content 36 associated with it that may be of interest to him. The notification from the client device 12 can take any conventional form e.g. involving a vibration, voice prompt, message, sound and so on. When the user examines the client device 12 as a result of the notification he is offered a choice to permit the digital content generation method to proceed or not. If he refuses permission then the process returns to step S1 and the client device 16 returns to its quiescent state. If the user grants permission then a user interaction process is activated.

The User Interaction Process, which is conveniently performed by the sensor data analyzer 30, is part of the primary content generation method that is invoked after the user has been notified that the current scene has digital content available, and it is therefore assumed that the user is holding, or interacting with, the client device 12 in a way that facilitates the use of the full set of available sensors 20, 22. For example, in response to receiving a notification following the user notification process, the user removes the client device 12 from a pocket or cover and holds it so that its image sensor(s) are not occluded and are therefore exposed to the scene.

In step S6, the full set of available sensors 20, 22 is activated (or at least more sensors than were activated during the quiescent state.)

Step S2 is then repeated as for the user notification process, with the exception that sensor data from the full(er) set of sensors 20, 22 is processed, rather than from the ambient sensor subset. It is noted that any explicit user input being entered via a device user interface at the point of sensing, either in response to previous content generated/rendered by the system 10 or in general interaction with another software application, also forms part of the captured sensor data. It is preferred that that the sensors 20, 22 repeatedly capture the scene at a defined frequency and that subsequent steps are carried out in a pipelined fashion for each successive set of sensor data.

Step S3 is then repeated as for the user notification process, with the exception that scene features derived from the full(er) set of sensors 20, 22 is processed, rather than from the ambient sensor subset.

Steps S4 and S5 are repeated as for the user notification process with the exception that additional digital content items 36 are identified from scene features derived from the full(er) set of sensors 20, 22, rather than from just the ambient sensor subset.

After Step S5 a set of digital content items 36 has been identified, based on the current scene.

In typical applications, e.g. where the system 10 is, or is part of, an augmented reality system the digital content items 36 that have been selected for the current scene are delivered (either automatically or upon user request) to the user's client device 12 (or to each client device 12 of a group in cases where a group has been established) and rendered to the user by the device 12 in any suitable conventional manner (e.g. by any one or more of an audio, visual and/or haptic rendering device (not illustrated) provided on the device 12). The digital content items 36 may be delivered to the client device 12 in any conventional manner, e.g. via network link 15 in the present example. It will be apparent however that the present invention is not limited to the delivery of the selected digital content to user(s) and from at least one aspect may relate only to the generation of the digital content for a specific user(s) in relation to a specific scene.

While it is envisaged that typical embodiments of the system 10 will include multiple mobile client devices communicating with one or more servers across a communications network, alternative embodiments are possible in which any one or more of the following variations may be implemented: a single client device; the whole system being implemented on the client device, i.e. no remote servers; non-mobile client device(s).

It will be apparent from the foregoing that advantageous features of preferred embodiments of the present invention include selection of digital content dynamically and contextually, and automated user notification of digital content availability. Other benefits of preferred embodiments include: multi-sensory array of sensors and use of sensor fusion; high-quality digital content is generated without laborious and difficult digital content design, modelling or animation processes (the level of abstraction of the content creation process is raised to the choice/configuration of content items on the content generation server 16); and elegant scaling to multi-user scenarios.

The invention is not limited to the embodiment(s) described herein but can be amended or modified without departing from the scope of the present invention.

Those skilled in the art will recognize improvements and modifications to the embodiments of the present disclosure. All such improvements and modifications are considered within the scope of the concepts disclosed herein and the claims that follow.

What is claimed is:

1. A digital content generating system comprising:
   at least one computing device associated with a respective user, said at least one computing device including or being connected to at least one sensor for detecting at least one aspect of an environment in which said at least one computing device is located;
   a respective sensor data analyzer configured to receive data, generated by said at least one sensor of a respective one of said at least one computing device, in respect of a real-world scene in said environment, said respective sensor data analyzer being configured to determine at least one feature of said real-world scene from said received data;
   a digital library containing a plurality of digital data content items, each data content item having associated respective metadata;
   a respective user record for said respective user, said respective user record containing respective user preferences for the respective user; and
   a data analytics system configured to match data being indicative of and/or derived from said at least one feature of said real-world scene and data being indicative of and/or derived from the respective user preferences for the respective user with said respective metadata and/or data derived from said metadata, and to create digital content for said respective user comprising at least one of said digital data content items that are deemed to match said real-world scene and the respective user preferences, wherein:

the digital content generating system is operable in a user notification mode in which at least one of said at least one sensor is repeatedly operated without activation by the respective user to generate said data from which said at least one feature of said real-world scene is determined by said respective sensor data analyzer, and in respect of which said data analytics system performs said matching; and upon determination that at least one of said digital data content items is deemed to match said real-world scene and the respective user preferences, said data analytics system is configured to cause the respective computing device to render a notification to the respective user.

2. The system of claim 1, further including at least one server hosting said data analytics system, and wherein said at least one computing device comprises a plurality of mobile client computing devices in communication with said at least one server via at least one communications network.

3. The system of claim 2, wherein either one or both of said digital library and said respective user record are located at said at least one server.

4. The system of claim 2, wherein said respective sensor data analyzer is provided on said respective mobile client computing device.

5. The system of claim 2, wherein said data analytics system is configured to create said digital content independently for the respective user of each of said mobile client computing devices, or to create common digital content for the respective users of more than one of said mobile computing devices deemed to belong to a group.

6. The system of claim 5, wherein said data analytics system is configured to determine that two or more of said respective users belong to a group by any one or more of: determining that said two or more respective users have requested to be in the group via the respective mobile client computing devices; determining that the respective mobile client computing devices are less than a threshold distance apart; determining from said respective data that is indicative of and/or derived from said at least one respective feature of said respective real-world scene that the respective real-world scenes are similar.

7. The system of claim 1, wherein said respective metadata comprises contextual and/or semantic information about the respective data content item.

8. The system of claim 1, wherein said data derived from said metadata comprises one or more semantic relationships between respective elements of the respective metadata, in particular elements of content context information contained in the respective metadata.

9. The system of claim 1, wherein said data derived from said at least one feature of said real-world scene comprises contextual and/or semantic information derived from said at least one real-world scene features.

10. The system of claim 9, wherein said data derived from said at least one feature of said real-world scene comprises one or more semantic relationships between respective elements of said scene context information.

11. The system of claim 1, wherein said data derived from the respective user preferences comprises one or more semantic relationships between respective user preference elements of the respective user record.

12. The system of claim 1, wherein said at least one sensor includes any one or more of multiple sensor types.

13. The system of claim 12, wherein said sensor types comprise image sensors, audio sensors, haptic input sensors, device orientation and movement sensors, device and user geolocation sensors, temperature sensors and humidity sensors.

14. The system of claim 12, wherein said respective sensor data analyzer is configured to determine said at least one feature of said real-world scene from data generated solely by any one of said at least one sensors.

15. The system of claim 12, wherein said respective sensor data analyzer is configured to determine said at least one feature of said real-world scene from data generated by any two or more of said at least one sensors using sensor fusion.

16. The system of claim 15, wherein said at least one sensor includes at least one sensor of any two or more of multiple sensor types, and wherein two or more of said at least one sensors are each of a different sensor type.

17. The system of claim 1, wherein said respective sensor data analyzer is configured to perform dimensionality reduction on any one or more of said at least one feature of said real-world scene.

18. The system of claim 1, including a content management system configured to perform addition, deletion, maintenance and/or generation of said metadata, and preferably also said data derived from said metadata.

19. The system of claim 1, wherein in said user notification mode at least one of said at least one sensors is not used.

20. The system of claim 1, configured to prompt the respective user via the respective computing device to activate a user interaction mode in response to said notification, wherein in said user interaction mode said at least one sensors operate to generate said data from which said at least one feature of said real-world scene is determined by said respective sensor data analyzer, and in respect of which said data analytics system performs said matching to create said digital content.

21. The system of claim 20, wherein in said user interaction mode more of said at least one sensors are operated than in said user notification mode.

22. The system of claim 1, configured to deliver said created digital content to said respective computing device for rendering to said respective user.

23. The system of claim 22, wherein the digital content generating system is part of an augmented reality system.

24. The system of claim 1, wherein said data generated by said at least one sensor in respect of a real-world scene in said environment includes data generated in response to said user's interaction with the respective computing device.

25. The system of claim 24, wherein said user interaction includes direct and/or indirect interaction between said user and any one or more of said at least one sensor.

26. The system of claim 24, wherein said user interaction comprises detection of said user by any one or more of said at least one sensor.

27. The system of claim 24, wherein said user interaction is in response to digital content rendered to the user by the system.

28. The system of claim 1, wherein the system is configured to modify said digital content and/or the user record, in response to user input detected by the respective computing device.

29. The system of claim 28, wherein said user input comprises user feedback in response to delivery of digital content to the user by the system.

30. The system of claim 1, wherein one or more elements of the user data record represent educational or training needs associated with the user.

31. The system of claim 30, wherein said one or more elements of the user data record that represent educational or training needs associated with the user are directly or indirectly entered into the system from the results of professional teaching or training assessments conducted by a qualified party.

32. The system of claim 1 wherein one or more elements of the user data record represent medical or healthcare needs associated with the user.

33. The system of claim 32 wherein said one or more elements of the user data record that represent medical or healthcare needs associated with that user are directly or indirectly entered into the system from the results of professional medical or healthcare assessments conducted by a qualified party.

34. A method of generating digital content for at least one computing device associated with a respective user, said at least one computing device including or being connected to at least one sensor for detecting at least one aspect of an environment in which said at least one computing device is located, said method comprising:
   receiving data, generated by said at least one sensor of a respective one of said at least one computing device, in respect of a real-world scene in said environment;
   determining at least one feature of said real-world scene from said received data;
   maintaining a digital library containing a plurality of digital data content items, each data content item having associated respective metadata;
   maintaining a respective user record for said respective user, said respective user record containing respective user preferences for the respective user;
   matching data that is indicative of and/or derived from said at least one feature of said real-world scene and data being indicative of and/or derived from the respective user preferences for the respective user with said respective metadata and/or data derived from said metadata; and
   creating digital content for said respective user comprising at least one of said digital data content items that are deemed to match said real-world scene and the respective user preferences, wherein:
      at least one of said at least one sensor is repeatedly operated without activation by the respective user to generate said data from which said at least one feature of said real-world scene is determined by said respective sensor data analyzer, and in respect of which said data analytics system performs said matching; and
      upon determination that at least one of said digital data content items is deemed to match said real-world scene and the respective user preferences, causing the respective computing device to render a notification to the respective user.

35. A digital content generating system comprising:
   at least one computing device associated with a respective user, said at least one computing device including or being connected to at least one sensor for detecting at least one aspect of an environment in which said at least one computing device is located;
   a respective sensor data analyzer configured to receive data, generated by said at least one sensor of a respective one of said at least one computing device, in respect of a real-world scene in said environment, said respective sensor data analyzer being configured to determine at least one feature of said real-world scene from said received data;
   a digital library containing a plurality of digital data content items, each data content item having associated respective metadata;
   a respective user record for said respective user, said respective user record containing respective user preferences for the respective user;
   a data analytics system configured to match data being indicative of and/or derived from said at least one feature of said real-world scene and data being indicative of and/or derived from the respective user preferences for the respective user with said respective metadata and/or data derived from said metadata, and to create digital content for said respective user comprising at least one of said digital data content items that are deemed to match said real-world scene and the respective user preferences; and
   at least one server hosting said data analytics system, wherein:
      said at least one computing device comprises a plurality of mobile client computing devices in communication with said at least one server via at least one communications network;
      said data analytics system is configured to create said digital content independently for the respective user of each of said mobile client computing devices, or to create common digital content for the respective user of more than one of said mobile computing devices deemed to belong to a group; and
      said data analytics system is configured to determine that two or more of said respective users belong to a group by any one or more of: determining that said two or more respective users have requested to be in the group via the respective mobile client computing devices; determining that the respective mobile client computing devices are less than a threshold distance apart; determining from said respective data that is indicative of and/or derived from said at least one respective feature of said respective real-world scene that the respective real-world scenes are similar.

* * * * *